United States Patent
Buch

(10) Patent No.: US 10,547,264 B1
(45) Date of Patent: Jan. 28, 2020

(54) MOTOR CONTROL CIRCUITRY FOR MULTIPLE-ACTUATOR SUPPORT

(71) Applicant: Seagate Technology LLC, Cupertino, CA (US)

(72) Inventor: Bruce Douglas Buch, Westborough, MA (US)

(73) Assignee: Seagate Technology LLC, Cupertino, CA (US)

( * ) Notice: Subject to any disclaimer, the term of this patent is extended or adjusted under 35 U.S.C. 154(b) by 52 days.

(21) Appl. No.: 15/702,977

(22) Filed: Sep. 13, 2017

(51) Int. Cl.
  H02P 23/00      (2016.01)
  H02P 25/034     (2016.01)
  H02P 7/025      (2016.01)
(52) U.S. Cl.
  CPC ......... H02P 23/0004 (2013.01); H02P 7/025 (2016.02); H02P 25/034 (2016.02)
(58) Field of Classification Search
  None
  See application file for complete search history.

(56) References Cited

U.S. PATENT DOCUMENTS

| | | | |
|---|---|---|---|
| 5,761,007 A | 6/1998 | Price et al. | |
| 6,091,559 A | 7/2000 | Emo et al. | |
| 6,297,612 B1 * | 10/2001 | Shloush | G05B 19/414 318/562 |
| 6,519,109 B1 | 2/2003 | Price et al. | |
| 6,625,498 B1 * | 9/2003 | Kurakake | G05B 19/0421 700/19 |
| 6,751,036 B2 | 6/2004 | Quak et al. | |
| 7,308,530 B1 * | 12/2007 | Armstrong | G06F 3/0611 711/112 |
| 7,596,722 B1 | 9/2009 | Pakzrad et al. | |
| 7,719,214 B2 * | 5/2010 | Leehey | G05B 19/042 318/286 |
| 8,963,455 B2 * | 2/2015 | Kurosawa | H02P 25/028 318/135 |
| 9,136,791 B2 * | 9/2015 | Inoue | H02P 31/00 |
| 2004/0075932 A1 * | 4/2004 | Watson | G11B 33/125 360/69 |
| 2004/0230711 A1 | 11/2004 | Moon et al. | |
| 2008/0177922 A1 | 7/2008 | Chow et al. | |
| 2011/0031906 A1 * | 2/2011 | Yasohara | G06F 13/4256 318/66 |

FOREIGN PATENT DOCUMENTS

WO    WO0108154    2/2001

* cited by examiner

*Primary Examiner* — Bickey Dhakal
(74) *Attorney, Agent, or Firm* — Mueting, Raasch & Gebhardt, P.A.

(57) ABSTRACT

An apparatus comprises a plurality of servo controllers and a plurality of motor control circuits. Each of the plurality of motor control circuits has a primary serial interface (SIF) coupled to one of the plurality of servo controllers and at least one secondary SIF coupled to others of the plurality of servo controllers. Each of a plurality of independently controllable actuators is coupled to one of the motor control circuits. Each of the plurality of motor control circuits is configured to generate a compensated control signal using an actuator command received from the primary SIF and an actuator command received from the at least one secondary SIF. Each of the plurality of motor control circuits is configured to control movement of one of the plurality of actuators using the compensated control signal.

19 Claims, 6 Drawing Sheets

MOTOR CONTROL CIRCUITRY FOR MULTIPLE-ACTUATOR SUPPORT

SUMMARY

Embodiments are directed to an apparatus comprising a first servo controller having an input and an output. A first motor control circuit comprises a primary serial interface (SIF) coupled to the first servo controller output, a secondary SIF, and an output. A first actuator is coupled to the output of the first motor control circuit. A second servo controller has an input and an output. A second motor control circuit comprises a primary SIF coupled to the second servo controller output, a secondary SIF, and an output. A second actuator is coupled to the output of the second motor control circuit, the second actuator controllable independently from the first actuator. The secondary SIF of the first motor control circuit is coupled to the output of the second servo controller. The first motor control circuit is configured to generate a first compensated control signal for controlling movement of the first actuator using a first actuator command received from the first servo controller and a second actuator command received from the second servo controller. The secondary SIF of the second motor control circuit is coupled to the output of the first servo controller. The second motor control circuit is configured to generate a second compensated control signal for controlling movement of the second actuator using the second actuator command received from the second servo controller and the first actuator command received from the first servo controller.

Other embodiments are directed to an apparatus comprising a plurality of servo controllers and a plurality of motor control circuits. Each of the plurality of motor control circuits has a primary SIF coupled to one of the plurality of servo controllers and at least one secondary SIF coupled to others of the plurality of servo controllers. Each of a plurality of independently controllable actuators is coupled to one of the motor control circuits. Each of the plurality of motor control circuits is configured to generate a compensated control signal using an actuator command received from the primary SIF and an actuator command received from the at least one secondary SIF. Each of the plurality of motor control circuits is configured to control movement of one of the plurality of actuators using the compensated control signal.

Some embodiments are directed to a method comprising receiving, by a first motor control circuit, a first actuator command from a first servo controller and a second actuator command from a second servo controller. The method comprises generating, by the first motor control circuit, a first compensated control signal using the first and second actuator commands, and controlling movement of the first actuator by the first motor control circuit using the first compensated control signal. The method also comprises receiving, by a second motor control circuit, the second actuator command from the second servo controller and the first actuator command from the first servo controller. The method comprises generating, by the second motor control circuit, a second compensated control signal using the second and first actuator commands, and controlling, independently of the first actuator, movement of the second actuator by the second motor control circuit using the second compensated control signal.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
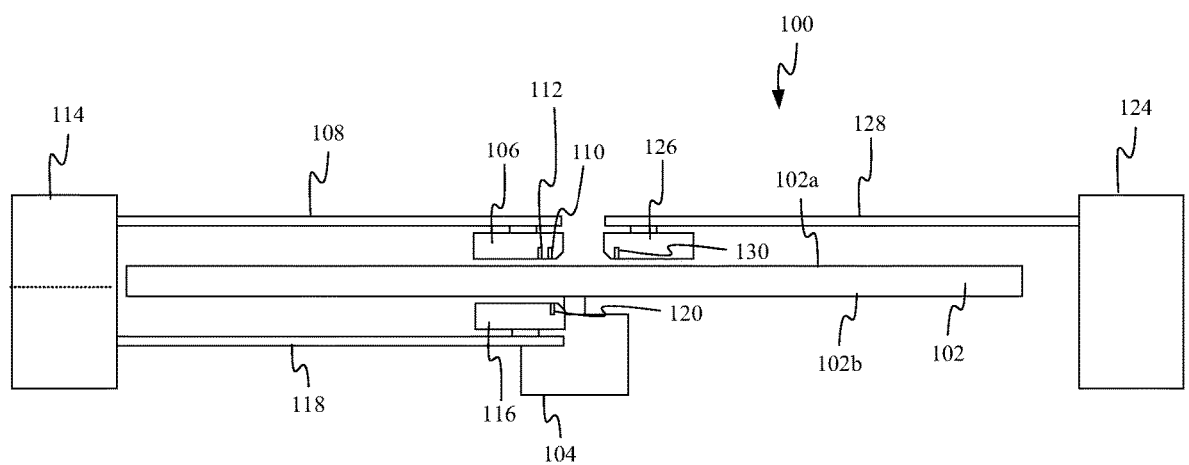
FIG. 1 is a diagram illustrating an apparatus comprising multiple independent actuators moveable over magnetic recording disk surfaces according to a various representative embodiments.

The present disclosure generally relates to data storage devices that utilize magnetic storage media, e.g., hard disks. The storage capacity of hard disk drives (HDDs) have steadily increased due to the increase in areal density provided by such technological advances as perpendicular recording, shingled recording, heat-assisted magnetic recording, helium filling, etc. This increase in HDD capacity, while reducing costs, can affect performance in some situations. For example, operations that require writing to large portions of the disk (such as a rebuild of a failed volume of a disk drive array) can take significant amounts of time given the increased capacity.

One way to address the need for greater HDD performance is to utilize multiple read/write heads in parallel. Such parallelism can increase the rate of input/output operations (IOPS) and thereby speed up certain operations. Use of simultaneously operating read/write heads can provide other options for a system designer in addition to an increase in IOPS. For example, an HDD can be configured with zones having different levels of throughput and capacity, and multiple heads can be operated in different modes to improve throughput in some zones while improving capacity (or other performance parameter) in others.

In embodiments described below, a hard disk drive includes multiple heads driven by separate actuators (e.g., voice coil motors) that can read from and/or write to one or more disks simultaneously. Simultaneous active heads can be used to increase data rate or for other purposes (e.g., to increase reliability, service different requests in parallel, etc.). The multiple heads can access the same disk or different disks, and may be moved across the disk surfaces in a number of different ways. In one configuration, a two (or more) part actuator may independently rotate two arms about a common axis. In other configurations, two or more actuators may be located at different locations around the disk, independently rotating about different axes.

In order to allow multiple heads to simultaneously write to and read from the same disk surface or to simultaneously read/write from/to different disk surfaces, the signal processing circuitry of the drive may include parallel processing paths. For example, the processing circuitry may include multiple read/write channels for processing (e.g., decoding and/or encoding) user and control data. The processing circuitry may also include multiple servo control logic sections that allow data from each reader to be used for servo control of the head or heads in which the readers are embedded. This servo logic also provides timing signals used by the signal processing logic.

Designs with multiple actuators simultaneously driving multiple heads can be flexibly configured, providing many options for optimizing different design parameters. However, activating multiple actuators simultaneously leads to both mechanical coupling between the actuators. This coupling can have detrimental effects on the drive both in the factory test and in the field. Therefore, embodiments below describe features and configurations that can mitigate the effect of multi-actuator coupling in an HDD.

Hard disk drives with multiple independent actuators can be referred to as parallel-transfer HDDs. Such HDDs simultaneously control multiple actuators and conduct concurrent read and write operations with those actuators to help scale I/O performance with the increasing capacity that has resulted from areal density advances. As previously discussed, the actuators may be on a common pivot or on separate pivots on a common baseplate. In both cases, torque imparted to one actuator generates a reaction force that mechanically couples into the other actuator and impairs its positioning unless countermeasures are taken to counteract the inter-actuator coupling.

In one such countermeasure according to various embodiments, the servo system controlling each actuator is made aware of the actuation commands issued by other servo controllers to their actuators, and applies counteracting actuation to its own actuator to compensate for the anticipated inter-actuator coupling. An alternative or assistive feedforward compensation can be implemented in the servo-to-actuator command paths. Each servo controller's actuator command is used to generate a compensation term for other servo controllers' actuators, and each command has a compensation term from the other servo controllers' actuation added to it.

FIG. 1 is a diagram illustrating an apparatus 100 according to a representative embodiment. The apparatus 100 includes at least one magnetic disk 102 driven by a spindle motor 104. A slider 106 (also referred to as a head, read/write head, read head, write head, recording head, etc.) is held over a first surface 102a of the disk 102 by an arm 108. An actuator 114 moves (e.g., rotates) the arm 108 to place the slider 106 over different tracks on the disk 102. In one embodiment, the slider includes a read transducer 110 and/or a write transducer 112. The read transducer 110 provides a signal in response to changing magnetic fields on the disk 102, and is coupled to a controller (not shown) where the separate signals are independently processed. The write transducer 112 receives signals from the controller and converts them to magnetic fields that change magnetic orientations of regions on the disk 102. In a configuration known as heat-assisted magnetic recording (HAMR), the write transducer 112 may also include an energy source (e.g., laser diode) that creates a hotspot on a region of the disk 102 currently being recorded.

The apparatus 100 includes a second slider 116 supported by a second arm 118. The second slider 116 is held over a second surface 102b of the disk 102 and actuator 114 causes the second arm 118 to move to different tracks on the disk 102. The arm 118 may move together with arm 108, or the arms 108, 118 may move independently (as indicated by dashed line on actuator 114 indicating a split actuator). In either configuration, the arms 108, 118 rotate around the same axis. The slider 116 also includes read and/or write transducers 120. The transducers 120 are capable of reading from and/or writing to disk surface 102b simultaneously with one or both of read/write transducers 110, 112 that access disk surface 102a.

In another embodiment, the apparatus 100 includes a third slider 126 supported by a third arm 128. The third slider 126 is held over the first surface 102a of the disk 102 and a second actuator 124 causes the third arm 118 to move to different tracks on the disk 102. The arm 128 and actuator 124 move independently of arm 108 and actuator 114. The slider 126 includes read and/or write transducers 130. The transducers 130 are capable of reading data from disk surface 102a simultaneously with one or both of read transducers 110, 112 of first slider 106. In this embodiment, the first slider 106 may include all or only one of the two or more read/write transducers 110, 112.

In the representative examples shown in FIG. 1, more than one disk 102 may be used, and the actuators 114, 124 may include heads that access some or all of the disk surfaces. Independently movable heads that utilize a split actuator 114 may generally access different surfaces, e.g., heads 106 and 116 access different surfaces 102a, 102b of disk 102 at the same time. Independently movable heads that utilize non-coaxial actuators 114, 124 may access the same surface at the same time, e.g., heads 106 and 126 may both access surface 102a at the same time. One effect that may be seen when multiple actuators are operating at once is that each head may be affected by mechanical coupling from other actuators that tends to cause the heads to move off track. These disturbances can be compensated for by a servo control system implemented in accordance with embodiments of the disclosure.

Figure 2:
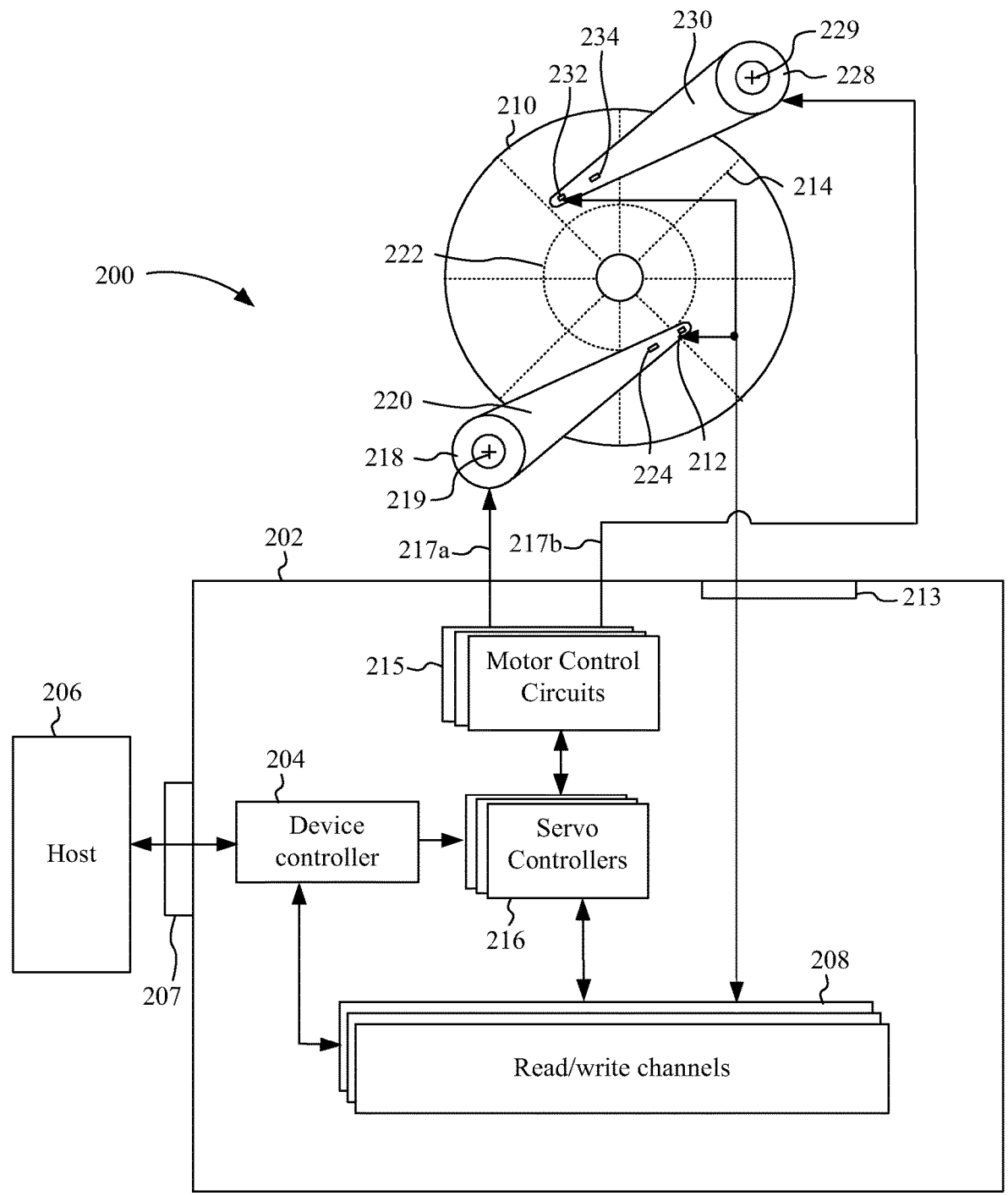
FIG. 2 is a diagram illustrating components of a hard disk drive comprising multiple independent actuators moveable over the same magnetic recording disk surface according to a representative embodiment.

In FIG. 2, a diagram illustrates components of a hard disk drive apparatus 200 that utilizes multiple independent actuators according to representative embodiments. The apparatus 200 includes circuitry 202 such as a device controller 204 that processes read and write commands and associated data from a host device 206 via a host interface 207. The host interface 207 includes circuitry that enables electronic communications via standard bus protocols (e.g., SATA, SAS, PCI, etc.). The host device 206 may include any electronic device that can be communicatively coupled to store and retrieve data to/from a data storage device, e.g., a computer, a server, a storage controller. The device controller 204 is coupled to a multiplicity of read/write channels 208 that read from and write to surfaces of one or more magnetic disks 210.

The read/write channels 208 generally convert data between the digital signals processed by the device controller 204 and the analog signals conducted through two or more heads 212, 232 during read and write operations. The heads 212, 232 may each include respective readers capable of concurrently reading the disk 210, e.g., from the same surface. The readers may be configured to read in any mode, such as conventional single-track, conventional multi-track, MSMR, TDMR, SMR, IMR, etc. The heads 212, 232 may also include respective writers that can concurrently write to the disk 210. The writers may be configured to write using a HAMR energy source, and may write in various track configurations, such as conventional, SMR, and IMR. In some embodiments, one of the heads 212, 232 includes one or more readers and one or more writers, while the other of heads 212, 232 includes one or more readers only and no writers.

The read/write channels 208 may include analog and digital circuitry such as decoders, timing-recovery units, error correction units, etc. The read/write channels 208 are coupled to the heads 212, 232 via interface circuitry 213 that may include preamplifiers, filters, digital-to-analog converters, analog-to-digital converters, etc. As shown in FIG. 2, the read/write channels 208 are capable of concurrently processing a plurality of data streams from the multiple heads 212, 232.

In addition to processing user data, the read/write channels 208 read servo data from servo marks 214 on the magnetic disk 210 via the heads 212, 232. The servo data are sent to servo controllers 216 and motor control circuits 215 that use the data to provide position control signals 217a, 217b to the actuators, as represented by voice coil motors (VCMs) 218 and 228. The VCM 218 rotates an arm 220 upon which heads 212 is mounted in response to the control signals 217a generated by the motor control circuits 215. The position control signals 217a may also be sent to microactuator 224 on arm 220 to finely control the position of head 212, e.g., causing small displacements of the head 212.

The VCM 218 may be a stacked or split actuator, in which case two VCM parts are configured to independently rotate different arms about a common axis 219. In such a case, another head (not shown) will access data on the opposite disk surface simultaneously with that of head 212, and this other head may be coupled to circuitry 202 in a manner similar to that of illustrated head 212. A second actuator, e.g., VCM 228, may independently and simultaneously rotate a second arm 230 about a second axis 229. Corresponding head 232 and microactuator 234 may be rotated by the VCM 228 in response to position control signals 217b, and may operate simultaneously with the head 212 and microactuator 224 under commands from the servo controllers 216.

Figure 3:
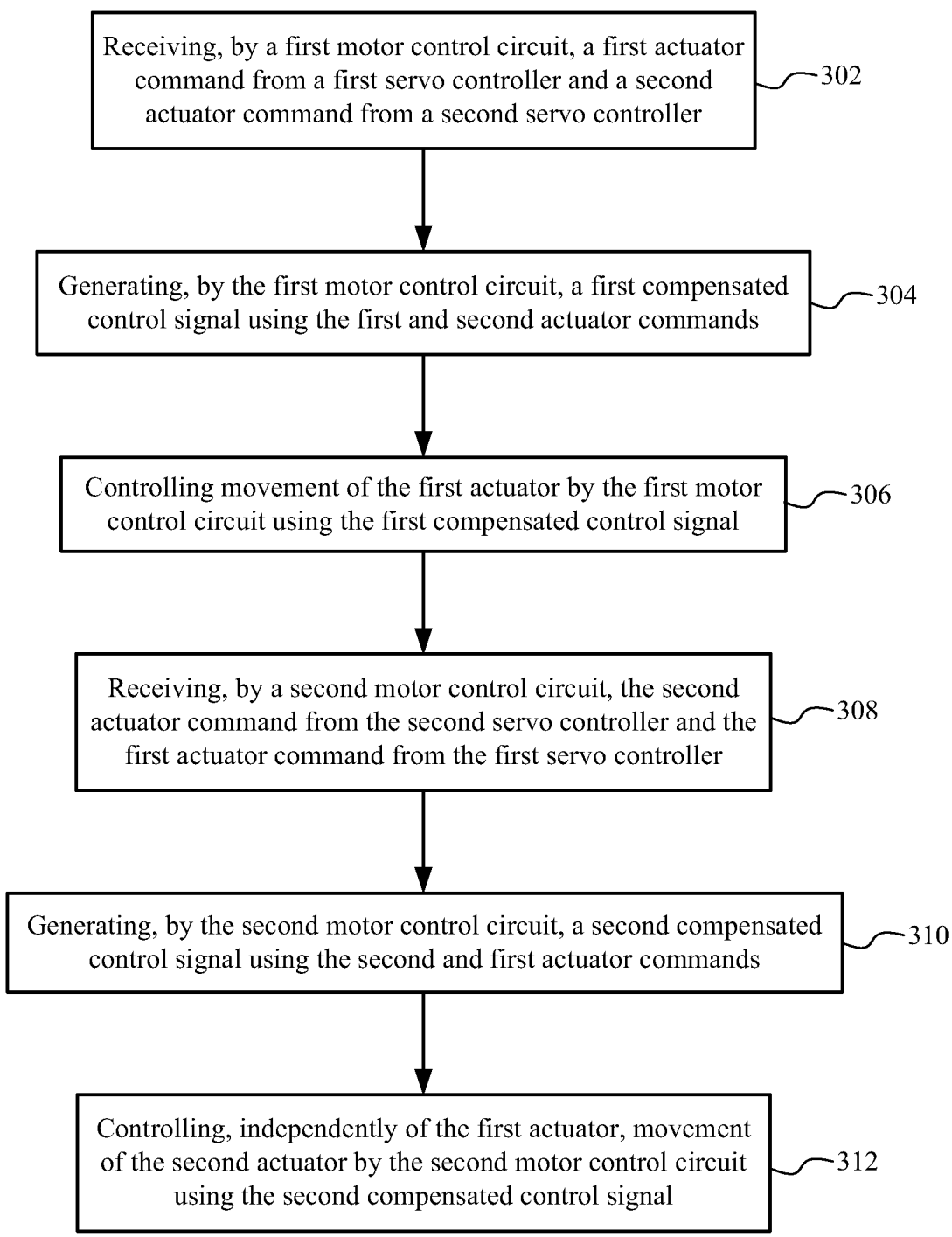
FIG. 3 is a flow diagram of a method for controlling multiple independent actuators using a multiplicity of motor control circuits and servo controllers in accordance with various embodiments.

FIG. 3 is a flow diagram of a method for controlling multiple independent actuators using a multiplicity of motor control circuits and servo controllers in accordance with various embodiments. The method shown in FIG. 3 can be implemented by the apparatuses illustrated in FIGS. 1 and 2. The method of FIG. 3 involves receiving 302, by a first motor control circuit, a first actuator command from a first servo controller and a second actuator command from a second servo controller. The method involves generating 304, by the first motor control circuit, a first compensated control signal using the first and second actuator commands. The method also involves controlling movement 306 of the first actuator by the first motor control circuit using the first compensated control signal. The method of FIG. 3 also involves receiving 308, by a second motor control circuit, the second actuator command from the second servo controller and the first actuator command from the first servo controller. The method involves generating 310, by the second motor control circuit, a second compensated control signal using the second and first actuator commands. The method further involves controlling 302, independently of the first actuator, movement of the second actuator by the second motor control circuit using the second compensated control signal.

Figure 4:
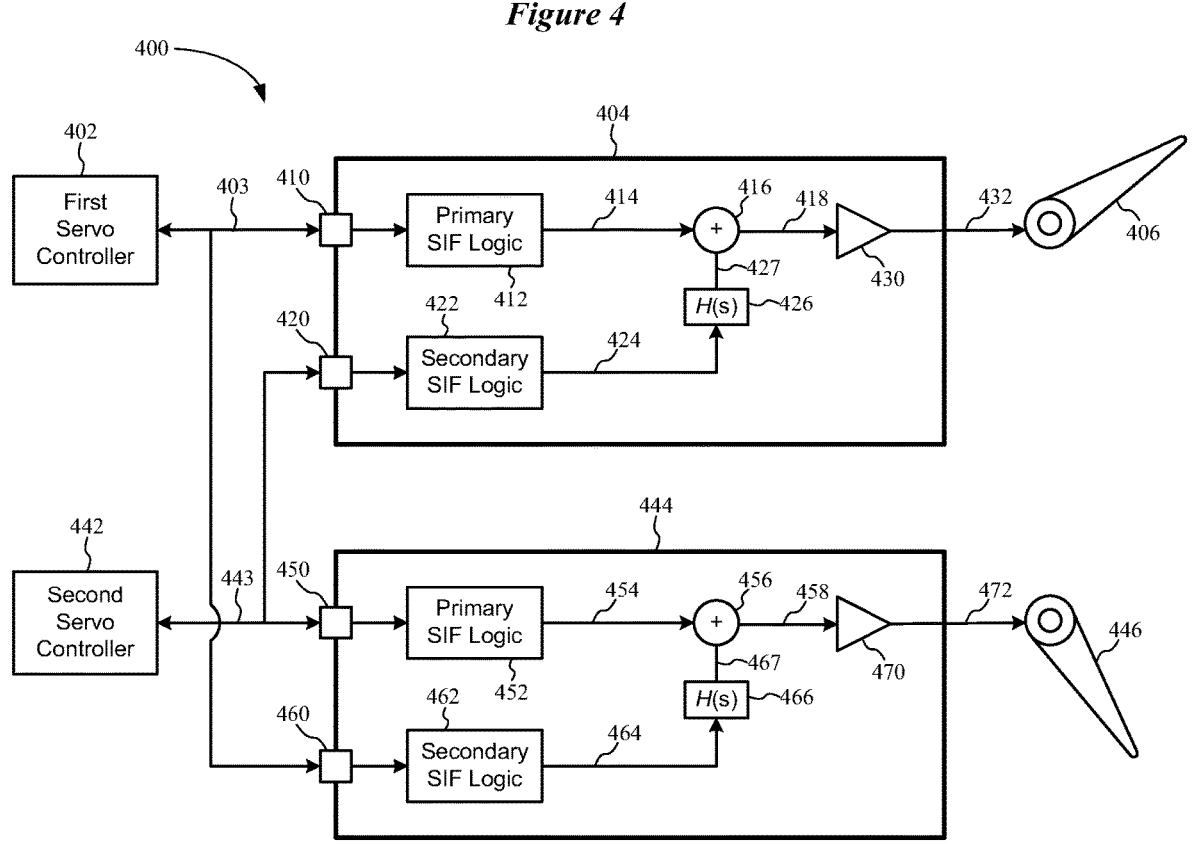
FIG. 4 is a block diagram of circuitry configured to control multiple independent actuators using a multiplicity of motor control circuits and servo controllers in accordance with various embodiments.

FIG. 4 is a block diagram of circuitry 400 configured to control multiple independent actuators using a multiplicity of motor control circuits and servo controllers in accordance with various embodiments. The circuitry 400 shown in FIG. 4 includes a first servo controller 402 and a second servo controller 442. Although not shown in FIG. 4, the first and second servo controllers 402 and 442 are coupled to a device controller that processes read and write commands and associated data from a host device via a host interface (see, e.g., FIG. 2). The first servo controller 402 is coupled to a first motor control circuit 404 which is configured to control movement of a first actuator 406. The second servo controller 442 is coupled to a second motor control circuit 444 which is configured to control movement of a second actuator 446. The first servo controller 402 and first motor control circuit 404 are configured to move the first actuator 406 independently of the second actuator 446 whose movement is controlled by the second servo controller 442 and the second motor control circuit 444.

It is been determined that provision of a dedicated motor control circuit for each independent actuator of a multi-actuator HDD provides a number of advantages over a single motor control circuit that services multiple independent actuators. A motor control circuit of the type shown in FIG. 4 is typically implemented as an application specific integrated circuit (ASIC) that converts digital servo control signals to high-power analog amplifier signals (e.g., 12V, >2-3A) for controlling the voice coil motor (VCM) of an independent actuator. The power requirements of a motor control circuit incorporating multiple high-power amplifiers in a single ASIC presents significant design challenges.

Heat management of a single ASIC incorporating multiple high-power amplifiers is a significant design challenge. For example, driving large currents through a motor control circuit incorporating multiple high-power amplifiers in a single ASIC incurs large internal power losses, which are manifested as heat. Also, the supply voltage provided to an ASIC suffers losses when large supply currents flow through chip-to-package power and ground connections with non-zero resistance. Supply voltage transients occur when large currents are switched though power and ground connections with parasitic inductance. Design measures must be taken to nullify power and ground resistance and inductance, or provide for separate ground and power connections.

Also, as is shown in FIG. 2, dual-actuator mechanics may have actuators located at opposite corners of an HDD. With two single-driver motor ASICs, the length of high-current printed circuit board traces can be minimized by placing each motor ASIC near its corresponding actuator. In contrast, multiple drivers collocated in the same ASIC would require running high current traces with a combined length of the diagonal length of the board. Economically, a single ASIC incorporating multiple high-power amplifiers is considered a low volume, high cost component when compared to a less expensive, high volume ASIC incorporating a single high-power amplifier.

According to various embodiments of the disclosure, each independent actuator is controlled via a single motor control circuit which significantly reduces the design challenges discussed hereinabove. In addition, a unique communication mechanism has been incorporated in each of the single motor control circuits to facilitate communication between individual motor control circuits in a manner that obviates the need for a communication bus between individual servo controllers. This inter-motor control circuit communication arrangement provides a mechanism to implement inter-actuator compensation without the latency penalty of servo-to-servo communication or the delay of synchronizing to a servo control interval. These and other features are further discussed in the following detailed discussion of FIG. 4.

The first motor control circuit 404 includes primary SIF logic 412 and secondary SIF logic 422. According to various embodiments, a SIF is a 1-bit-wide bus that a servo controller uses to write and read registers in the motor control circuit. There is a 1-bit Data signal, a Clock signal, and an Enable signal. The address and data vectors for a write or read operation are sent serially on the Data signal, along with a bit indicating whether the operation is a write or a read. The Clock signal demarcates bit periods, and the framing of an address+data packet is indicated by the assertion of the Enable signal. The address designates which motor control circuit register is the target of the data being written or read. One such register would be the one that provides input to a digital-to-analog converter (DAC) that determines the current driven to the output of the motor control circuit (see, e.g., register 514 of FIG. 5). Serial communication is used for the motor control circuit because it saves pins and wires, and despite the multiple clock cycles it takes to send address and data information serially, it is sufficiently fast, given the time scale of motor operations. It is understood, however, that embodiments of the disclosure are not limited only to serial communication, nor to a synchronous SIF implementation described herein. For example, a parallel interface, or an asynchronous serial protocol (e.g., no clock, such as a UART protocol), can be used as well.

The first motor control circuit 404 includes a primary SIF port 410 coupled to primary SIF logic 412. The primary SIF port 410 is communicatively coupled to the first servo controller 402 and receives a first actuator command 403 from the first servo controller 402. The first actuator command 403 is processed by the primary SIF logic 412, and the processed first actuator command 414 is communicated to a first summer 416.

The first motor control circuit 404 also includes a secondary SIF port 420 coupled to secondary SIF logic 422. The secondary SIF port 420 is communicatively coupled to the second servo controller 442 and receives a second actuator command 443 from the second servo controller 442. The secondary SIF logic 422 processes the second actuator command 443, and the processed second actuator command 424 is communicated to a first transfer function engine 426.

The first transfer function engine 426 is configured to generate a first feed-forward compensation term 427 in response to the processed second actuator command 424. The first feed-forward compensation term 427 is communicated from the first transfer function engine 426 to the first summer 416. The first summer 416 is configured to combine the processed first actuator command 414 and the first feed-forward compensation term 427 to generate a first compensated control signal 418. It can be seen that the first compensated control signal 418 includes the first actuator command 403 from the first servo controller 402 and a compensation term 427 based on the second actuator command 443 generated by the second servo controller 442.

The first compensated control signal 418 is converted to an analog signal (see FIG. 5) and communicated to a first amplifier 430. The first amplifier 430 generates an analog first compensated control signal 432 which is communicated to the first actuator 406. For example, and in some embodiments, the analog first compensated control signal 432 may take the form of a pulse-width-modulated (PWM) signal during seeks, then take the form of a continuous linear signal during track-following. Because the first compensated control signal 432 includes a compensation term 427 responsive to the second actuator command 424, the first actuator 406 is driven with counteracting actuation that compensates for the anticipated inter-actuator coupling between the first actuator 406 and the second actuator 446.

The second motor control circuit 444 includes primary SIF logic 452 and secondary SIF logic 462. The second motor control circuit 444 includes a primary SIF port 450 coupled to primary SIF logic 452. The primary SIF port 450 is communicatively coupled to the second servo controller 442 and receives the second actuator command 443 from the second servo controller 442. The second actuator command 443 is processed by the primary SIF logic 452, and the processed first actuator command 454 is communicated to a second summer 456.

The second motor control circuit 444 also includes a secondary SIF port 460 coupled to secondary SIF logic 462. The secondary SIF port 460 is communicatively coupled to the first servo controller 402 and receives the first actuator command 403 from the first servo controller 402. The secondary SIF logic 462 processes the first actuator command 403, and the processed first actuator command 464 is communicated to a second transfer function engine 466.

The second transfer function engine 466 is configured to generate a second feed-forward compensation term 467 in response to the processed first actuator command 464. The second feed-forward compensation term 467 is communicated from the second transfer function engine 466 to the second summer 456. The second summer 456 is configured to combine the processed second actuator command 454 and the second feed-forward compensation term 467 to generate a second compensated control signal 458. It can be seen that the second compensated control signal 458 includes the second actuator command 443 from the second servo controller 442 and a compensation term 467 based on the first actuator command 403 generated by the first servo controller 402.

The second compensated control signal 458 is converted to an analog signal (see FIG. 5) and communicated to a second amplifier 470. The second amplifier 430 generates an analog second compensated control signal 472 which is communicated to the second actuator 446. Because the second compensated control signal 472 includes a compensation term 467 responsive to the first actuator command 464, the second actuator 446 is driven with counteracting actuation that compensates for the anticipated inter-actuator coupling between the second actuator 446 and the first actuator 406.

According to various embodiments, the circuitry 400 shown in FIG. 4 is devoid of a communication bus between the first servo controller 402 and a second servo controller 442. In a conventional configuration, communication between individual servo systems controlling individual actuators would require a communication bus directly between respective servo controllers which suffers from the latency penalty of servo-to-servo communication and the delay of synchronization to a servo control interval. Incorporation of secondary SIF logic 422, 462 and associated secondary SIF ports 420, 460 and interconnections provides for communication between individual servo systems (402, 404, 406 and 442, 444, 446) without the need for a servo-to-servo communication bus. As such, the first and second servo controllers 402 and 442 communicate with each other only via their respective secondary SIFs and SIF ports.

In accordance with various embodiments, the secondary SIF ports 420 and 460 are configured as written-to-only ports. In other words, data can be written to but not read from the secondary SIF ports 420 and 460. As such, secondary SIF logic 422 and 462 is configured as written-to-only logic. The written-to-only secondary SIF port 420 of motor control circuit 404 is configured to snoop the actuator commands 443 output to the primary SIF port 450 by the second servo controller 442. Similarly, written-to-only secondary SIF port 460 of motor control circuit 444 is configured to snoop the actuator commands 403 output to the primary SIF port 410 by the first servo controller 402. Configuring the secondary SIF ports 420 and 460 as written-to-only ports results in a simplified design and eliminates contention problems that can arise when allowing the secondary SIF ports 420 and 460 to both write and read data.

For purposes of illustration, FIG. 4 shows two servo systems for controlling two independent actuators that are controllably movable over the same recording surface. In some embodiments, more than two servo systems and independent actuators can be provided. For example, up to four independent actuators movable over the same recording surface can be controlled by four servo systems. In such a configuration, each of the four servo systems can communicate its actuator command to the secondary SIF ports/logic of the other three servo systems in a manner described hereinabove. Each of the four servo systems can receive an actuator command from the other three servo systems via its secondary SIF ports/logic in a manner described hereinabove. As such, each of the four servo systems drives it respective actuator with counteracting actuation that compensates for the anticipated inter-actuator coupling between the four independent actuators.

Figure 5:
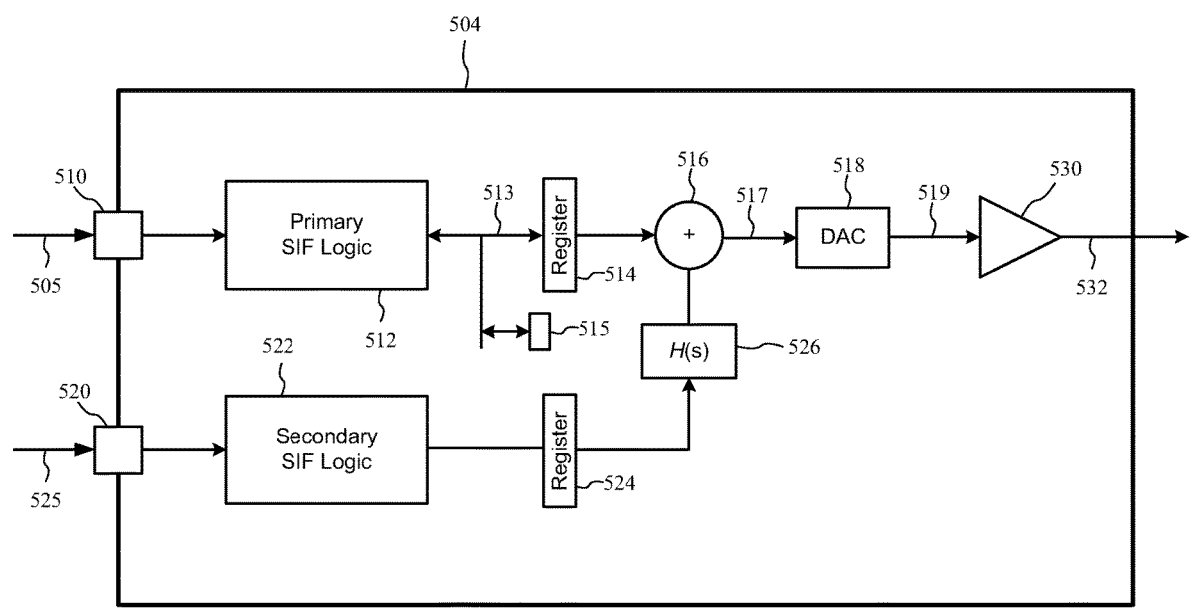
FIG. 5 shows additional details of a motor control circuit in accordance with various embodiments.

FIG. 5 shows additional details of a motor control circuit 504 in accordance with various embodiments. As was discussed previously, the motor control circuit 504 can be implemented as an ASIC. The motor control circuit 504 includes primary SIF logic 512 coupled to a primary SIF port 510, and secondary SIF logic 522 coupled to a secondary SIF port 520. The primary SIF port 510 is configured to receive a digital actuator command 505 from a first servo controller, and the secondary SIF port 520 is configured to receive a digital actuator command 525 from a second servo controller. The primary SIF logic 512 is coupled to a register 514 via an internal parallel bus 513. The register 514 is configured to capture digital actuator commands processed by the primary SIF logic 512. Other registers, such as register 515, can be coupled to the parallel bus 513 for other functions serviced by the motor control circuit 504.

A register 524 is coupled to the secondary SIF logic 522 and configured to capture digital actuator commands 525 received from the second servo controller and processed by the secondary SIF logic 522. An output of register 524 is coupled to a transfer function engine 526 configured to generate a digital feed-forward compensation term which is communicated to a summer 516. The summer 516 adds the digital feed-forward compensation term to the processed digital actuator command from the register 514 to produce a digital compensated control signal 517. In response to receiving the digital compensated control signal 517, a digital-to-analog converter (DAC) 518 generates an analog compensated control signal 519, which is communicated to an analog power amplifier 530. The amplifier 530 generates an analog compensated control signal 532, which is communicated to an actuator.

It is noted that the coupling cancellation processes performed by the transfer function engine 526 can be implemented in hardware or in firmware running on a small embedded controller integrated into the motor control circuit 504. Parameters for defining the coupling cancellation transfer function, H(s), can be derived from calibration and measurement exercises to characterize actuator coupling by each of the servo controllers. These parameters can be loaded into a memory of the motor control circuit 504 via the primary SIF port 510/primary SIF logic 512 for access by the transfer function engine 526.

Figure 6:
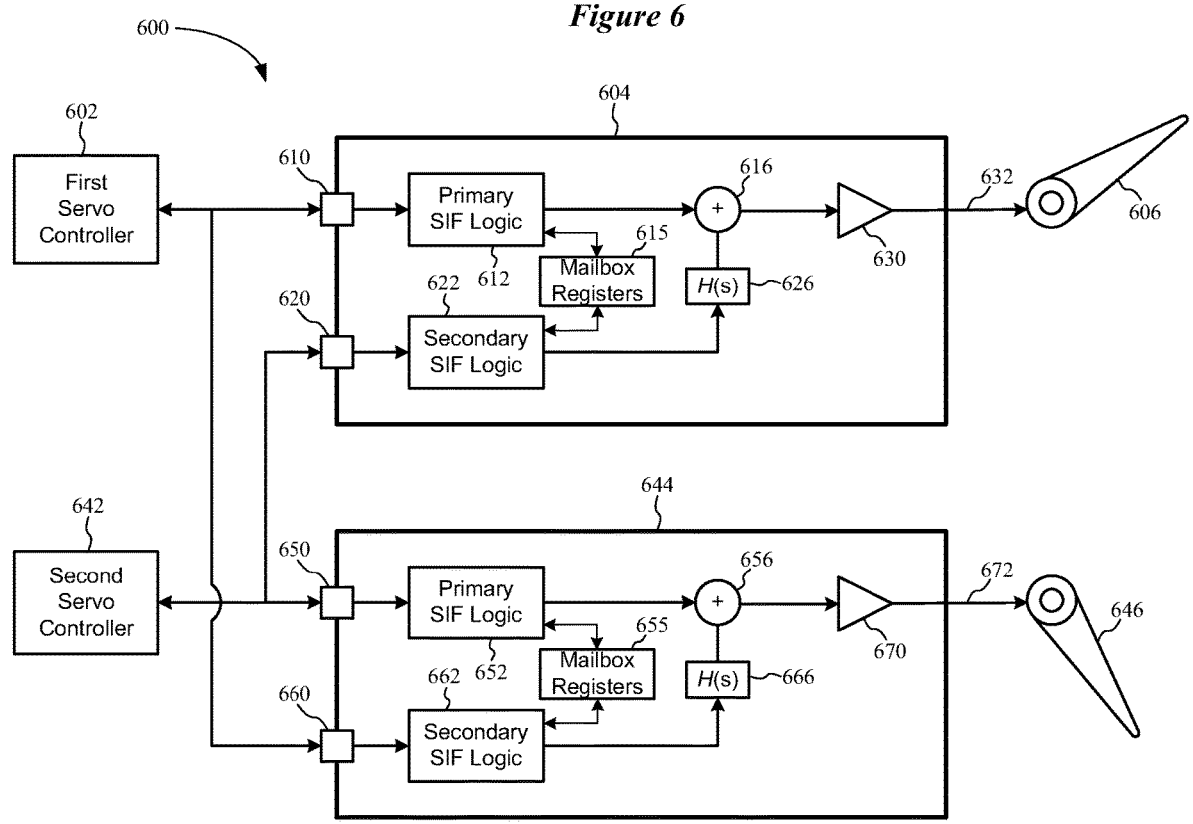
FIG. 6 is a block diagram of circuitry configured to control multiple independent actuators using a multiplicity of motor control circuits and servo controllers in accordance with various embodiments.

FIG. 6 is a block diagram of circuitry 600 configured to control multiple independent actuators using a multiplicity of motor control circuits and servo controllers in accordance with various embodiments. The circuitry 600 shown in FIG. 6 is equivalent to that shown in FIG. 4 but includes additional circuitry in the form of mailbox registers 615 and 655.

Briefly, the circuitry 600 shown in FIG. 6 includes a first servo controller 602 coupled to a first motor control circuit 604 which drives a first actuator 606. A second servo controller 642 is coupled to a second motor control circuit 644 which drives a second actuator 646. The first motor control circuit 604 includes primary SIF logic 612 coupled to a primary SIF port 610 and a summer 616. Secondary SIF logic 622 is coupled to a secondary SIF port 620 and the summer 616 via a first transfer function engine 626. The secondary SIF port 620 is coupled to the second servo controller 642. An output of the summer 616 is coupled to an input of an analog power amplifier 630 which produces a first compensated control signal for controllably moving the first actuator 606.

The second motor control circuit 644 includes primary SIF logic 652 coupled to a primary SIF port 650 and a summer 656. Secondary SIF logic 662 is coupled to a secondary SIF port 660 and the summer 656 via a second transfer function engine 666. The secondary SIF port 660 is coupled to the first servo controller 602. An output of the summer 656 is coupled to an input of an analog power amplifier 670 which produces a second compensated control signal for controllably moving the second actuator 646. Although not discussed in detail, it is understood that the circuitry shown in FIG. 6 can function in a manner equivalent to that described previously with reference to the circuitry of FIG. 4.

According to various embodiments, the first servo controller 602 is configured to transfer data to the mailbox registers 655 of the second motor control circuit 644 via the secondary SIF port 660/secondary SIF logic 662 of the second motor control circuit 644. The second servo controller 642 is configured to retrieve the transferred data from the mailbox registers 655 of the second motor control circuit 644 via the primary SIF port 650/primary SIF logic 652. In a similar manner, the second servo controller 642 is configured to transfer data to the mailbox registers 615 of the first motor control circuit 604 via the secondary SIF port 620/secondary SIF logic 622 of the first motor control circuit 604. The first servo controller 602 is configured to retrieve the transferred data from the mailbox registers 615 of the first motor control circuit 604 via the primary SIF port 610/primary SIF logic 612.

Incorporation of mailbox registers 615 and 655 in the first and second motor control circuit 604 and 644 enhances communication between the first and second servo controller 602 and 642 in the absence of a communication bus provided directly between the first and second servo controller 602 and 642. The data transferred to and retrieved from the mailbox registers 615 and 655 may be of various types. For example, the second servo controller 642 may be a slave to the first servo controller 602 (master) and dependent on the first servo controller 602 for certain communications. The first servo controller 602 may receive an idle mode, spin-down, or sensor message which can be communicated to the second servo controller 642 via the secondary SIF port 660/secondary SIF logic 662/mailbox registers 655 of the second motor control circuit 644. The second servo controller 642 can access the message transferred to the mailbox registers 655 via the primary SIF port 650/primary SIF logic 652. By way of further example, the mailbox registers 615 and 655 can be used to coordinate the activity of the first and second servo controllers 602 and 642 during calibration and measurement exercises to characterizing actuator coupling as previously described.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. An apparatus, comprising:
  a hard disk drive comprising:
    a first servo controller having an input and an output;
    a first motor control circuit comprising a primary serial interface (SIF) coupled to the first servo controller output, a secondary SIF, and an output;
    a first actuator coupled to the output of the first motor control circuit;
    a second servo controller having an input and an output;
    a second motor control circuit comprising a primary SIF coupled to the second servo controller output, a secondary SIF, and an output;
    a second actuator coupled to the output of the second motor control circuit, the second actuator controllable independently from the first actuator;
    the secondary SIF of the first motor control circuit coupled to the output of the second servo controller, the first motor control circuit configured to generate a first compensated control signal for controlling movement of the first actuator using a first actuator command received from the first servo controller and a second actuator command received from the second servo controller; and
    the secondary SIF of the second motor control circuit coupled to the output of the first servo controller, the second motor control circuit configured to generate a second compensated control signal for controlling movement of the second actuator using the second actuator command received from the second servo controller and the first actuator command received from the first servo controller.

2. The apparatus of claim 1, wherein the secondary SIFs of the first and second motor control circuits are configured as written-to-only SIFs.

3. The apparatus of claim 1, wherein:
  the first motor control circuit comprises a first transfer function engine configured to generate a first feed-forward compensation term in response to the received second actuator command; and
  the second motor control circuit comprises a second transfer function engine configured to generate a second feed-forward compensation term in response to the received first actuator command.

4. The apparatus of claim 3, wherein:
  the first motor control circuit comprises a first summer configured to combine the first feed-forward compensation term with the first actuator command to generate the first compensated control signal; and
  the second motor control circuit comprises a second summer configured to combine the second feed-forward compensation term with the second actuator command to generate the second compensated control signal.

5. The apparatus of claim 1, wherein the apparatus is devoid of a communication bus between the first and second servo controllers.

6. The apparatus of claim 1, wherein the first and second servo controllers communicate with each other via only the secondary SIFs of the first and second motor control circuits.

7. The apparatus of claim 1, wherein each of the first and second motor control circuits comprises mailbox registers coupled between their respective primary and secondary SIFs.

8. The apparatus of claim 7, wherein:
  the first servo controller is configured to transfer data to the mailbox resisters of the second motor control circuit via the secondary SIF of the second motor control circuit, and the second servo controller is configured to retrieve the data from the mailbox registers of the second motor control circuit via the primary SIF of the second motor control circuit; and
  the second servo controller is configured to transfer data to the mailbox resisters of the first motor control circuit via the secondary SIF of the first motor control circuit, and the first servo controller is configured to retrieve the data from the mailbox registers of the first motor control circuit via the primary SIF of the first motor control circuit.

9. An apparatus, comprising:
  a hard disk drive comprising:
    a plurality of servo controllers;
    a plurality of motor control circuits each having a primary serial interface (SIF) coupled to one of the plurality of servo controllers and at least one secondary SIF coupled to others of the plurality of servo controllers; and
    a plurality of independently controllable actuators each coupled to one of the motor control circuits;
    wherein each of the plurality of motor control circuits is configured to generate a compensated control signal using an actuator command received from the primary SIF and an actuator command received from the at least one secondary SIF, and each of the plurality of motor control circuits is configured to control movement of one of the plurality of actuators using the compensated control signal.

10. The apparatus of claim 9, wherein the secondary SIFs are configured as written-to-only SIFs.

11. The apparatus of claim 9, wherein each of the plurality of motor control circuits comprises a programmable transfer function engine configured to generate a feed-forward compensation term in response to the actuator command received by their at least one secondary SIF.

12. The apparatus of claim 11, wherein each of the plurality of motor control circuits comprises a summer configured to combine the feed-forward compensation term with the actuator command received from their primary SIF to generate the compensated control signal.

13. The apparatus of claim 9, wherein the apparatus is devoid of a communication bus between the plurality of servo controllers.

14. The apparatus of claim 9, wherein the plurality of servo controllers communicate with each other via only the secondary SIFs.

15. The apparatus of claim 9, wherein each of the plurality of motor control circuits comprises mailbox registers coupled between their respective primary and secondary SIFs.

16. The apparatus of claim 15, wherein:
a first servo controller of the plurality of servo controllers is coupled to a first motor control circuit of the plurality of motor control circuits;
a second servo controller of the plurality of servo controllers is coupled to a second motor control circuit of the plurality of motor control circuits;
the first servo controller is configured to transfer data to the mailbox resisters of the second motor control circuit via the secondary SIF of the second motor control circuit, and the second servo controller is configured to retrieve the data from the mailbox registers of the second motor control circuit via the primary SIF of the second motor control circuit; and
the second servo controller is configured to transfer data to the mailbox resisters of the first motor control circuit via the secondary SIF of the first motor control circuit, and the first servo controller is configured to retrieve the data from the mailbox registers of the first motor control circuit via the primary SIF of the first motor control circuit.

17. A method implemented by a hard disk drive, comprising:
receiving, by a first motor control circuit, a first actuator command from a first servo controller and a second actuator command from a second servo controller;
generating, by the first motor control circuit, a first compensated control signal using the first and second actuator commands;
controlling movement of a first actuator relative to a magnetic recording disk surface by the first motor control circuit using the first compensated control signal;
receiving, by a second motor control circuit, the second actuator command from the second servo controller and the first actuator command from the first servo controller;
generating, by the second motor control circuit, a second compensated control signal using the second and first actuator commands; and
controlling, independently of the first actuator, movement of a second actuator by the second motor control circuit using the second compensated control signal, wherein:
each of the first and second motor control circuits comprises a primary serial interface (SIF) and a secondary SIF;
the first motor control circuit receives the second actuator command via its secondary SIF; and
the second motor control circuit receives the first actuator command via its secondary SIF.

18. The method of claim 17, wherein the first and second servo controllers communicate with each other via only the secondary SIFs of the first and second motor control circuits.

19. The method of claim 17, wherein the secondary SIFs are configured as written-to-only interfaces.

\* \* \* \* \*